Figure 1:
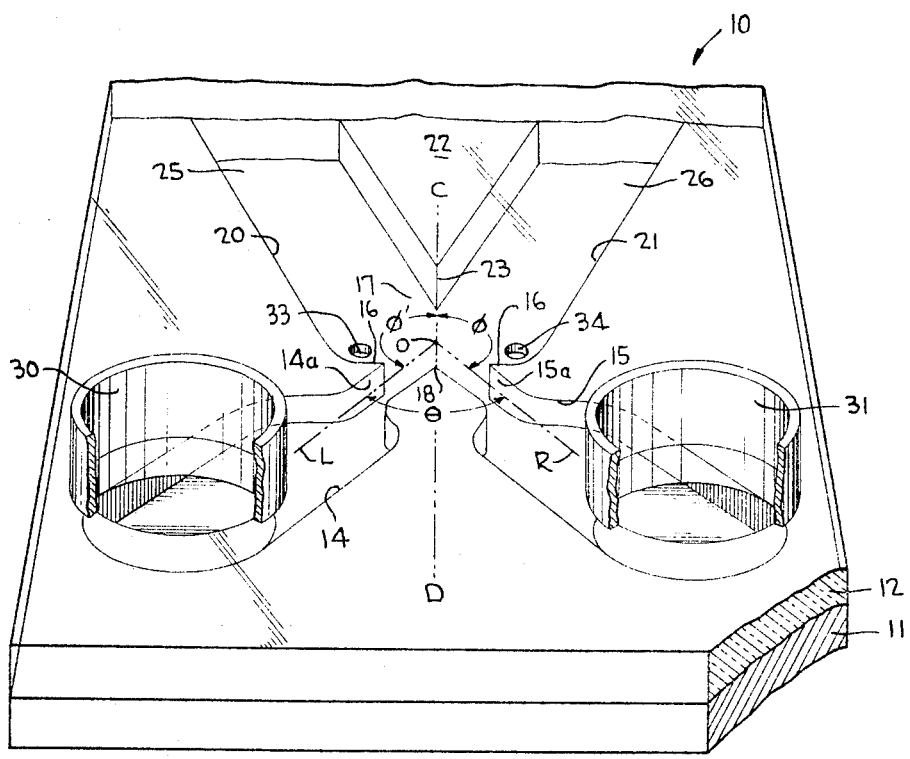

Sept. 13, 1966  R. E. BOWLES  3,272,212
PURE FLUID COMPARATOR
Filed May 31, 1963  2 Sheets-Sheet 1

INVENTOR,
ROMALD E. BOWLES

BY Harry M. Saragovitz,
Edward J. Kelly,
Herbert Berl &
J. P. Edgerton  ATTORNEYS.

Sept. 13, 1966 R. E. BOWLES 3,272,212
PURE FLUID COMPARATOR
Filed May 31, 1963 2 Sheets-Sheet 2

INVENTOR,
ROMALD E. BOWLES
BY Harry M. Saragovitz,
Edward J. Kelly,
Herbert Berl &
J. P. Edgerton ATTORNEYS 3,272,212
PURE FLUID COMPARATOR
Romald E. Bowles, Silver Spring, Md., assignor to the United States of America as represented by the Secretary of the Army
Filed May 31, 1963, Ser. No. 284,756
6 Claims. (Cl. 137—81.5)

The invention described herein may be manufactured and used by or for the Government for governmental purposes without the payment to me of any royalty thereon.

This invention relates generally to pure fluid systems and more specifically to a pure fluid comparator for comparing pressure differentials between fluid input signals without the use of any moving mechanical parts.

In general, the comparison of pressure differentials between analog-type, fluid input signals can be most readily achieved by a fluid comparator. Basically, a comparator is a logic component which effectively compares the instantaneous magnitudes of one signal to that of another signal and produces an output signal corresponding to the sense and magnitude of differentials that exist between the two signals.

The fluid comparator disclosed in the present invention, does not incorporate any moving parts other than the operating fluid, and therefore does not suffer from the disadvantages normally associated with mechanically moving elements which are employed in existing mechanical comparators. In known mechanical comparators frictional forces that are developed by interacting mechanical parts such as valves and pistons create heat and wear in the device incorporating such parts. In addition, the inertia of the moving parts in conjunction with the associated frictional forces increase the overall response time and the residual hysteresis of the device. Since a comparator is required to switch its flow in response to recurring changes of some condition, for instance, a change of fluid pressure, a short time constant, high reliability and control of the hysteresis characteristics are important advantageous features. It is, therefore, primarily important to reduce or eliminate, if possible, all moving mechanical parts from the comparator mechanism. The fluid comparator of the instant invention employs only fluid input signals to operate; all mechanical elements or components forming the unit remain stationary during operation thereof, so that the comparator has a minimum switching time to a fluctuation in a fluid input signal and a low hysteresis characteristic.

As contemplated by the present invention, a typical fluid comparator comprises a pair of angularly disposed nozzles having the outlet orifices thereof extending through an end wall of an interaction chamber. The nozzles are positioned at an angle less than 180° relative to one another, whereby the fluid jets issuing the angularly disposed nozzles with at least a predetermined minimum pressure for which the unit is designed, angularly intercept one another in an interaction chamber.

The interaction chamber is defined in a typical case by an end wall and two outwardly diverging sidewalls hereinafter referred to as the left and right sidewalls, enclosed by planar top and bottom walls. Although the sidewalls can be used to confine the fluid to the interacting chamber and thus make it possible to have the streams interact in a region at some desired pressure, the sidewalls may be positioned so that they are remote from the high velocity portions of the interacting streams. Thus, the interaction between the streams and consequently the final direction of the combined streams is a function of the relative momenta of the two streams, the sidewalls having little effect on the interaction.

Alternatively, the left and right sidewalls of the interaction chamber may be positioned sufficiently close to the orifices of the angularly disposed nozzles so that boundary layer effects are created between the combined fluid streams and the sidewalls of the interaction chamber. Such a construction would result in the switching of the combined stream into one or the other of a pair of output passages depending upon the relative magnitudes between the fluid signals supplied to the nozzles. For example, if left and right nozzles supplied interacting fluid streams into the interaction chamber and the right nozzle supplied a fluid signal of greater magnitude than that supplied to the left nozzle the combined fluid stream would attach to the left sidewall and egress from the left output passage with little or no fluid output from the right output passage. Thus, the positioning of the sidewalls in the interaction chamber governs the type of output which can be anticipated from the comparator for a given input signal supplied to the nozzles.

A V-shaped divider is disposed at a predetermined distance from the end wall with the apex of the divider disposed along the centerline between the orifices of the nozzles, the sides of the divider being generally parallel to the left and right sidewalls of the chamber. The regions between the sides of the divider and the left and right sidewalls define left and right output passages, respectively.

With regard to the aforementioned nozzles, the left nozzle of the pair is positioned with respect to the divider and the interaction chamber so that it discharges all, or essentially all, of its stream into the right passage; the right nozzle being correspondingly positioned to discharge all, or essentially all, of its stream into the left passage. The nozzles are designed to have substantially equal cross-sectional areas.

To effect a pressure comparison, fluid at some predetermined pressure is supplied, for example, to the left nozzle and a well-defined and constricted stream issues from that nozzle into the interaction chamber. All, or substantially all of this fluid is directed into the right output passage. Input fluid signals which may take the form of fluctuations of pressure, either decreasing or increasing, are supplied to the right nozzle and these signals issue from that nozzle to interact with, and thereby deflect the stream issuing from the left nozzle to a degree dependent upon relative momenta of the input signal discharging from the right nozzle and the standard or reference signal discharging from the left nozzle. In general, the momentum of a stream depends upon the size and speed of the stream and upon the density, viscosity, compressibility and other properties of the fluids involved, and any one or more of these properties may be varied in order to impart predetermined characteristics to the comparator. In a momentum exchange type of fluid comparator wherein the nozzle sizes are equal and the fluids the same, equal pressures applied to the fluids and supplied to the two nozzles produce interacting streams of equal mass flows and equal energies. Therefore, a null in such a system indicates an equality of momentum of fluid flow from the output passages.

As the pressure differentials increase or decrease from the null condition, the combined stream will move across the apex of the divider as a function of stream momenta, and the relative proportions of fluid entering the two outlet passages are varied correspondingly. The pressure differences between the input signals may then be measured by determining the difference in fluid pressures in the two outlet passages.

Broadly, it is an object of this invention to provide a fluid comparator having no moving mechanical parts.

More specifically, it is an object of this invention to provide a pure fluid comparator for comparing the pressure differentials between analog fluid input signals.

Yet another object of this invention is to provide a differential fluid comparator wherein the output signal level approximates the levels of the input signals.

Figure 2:
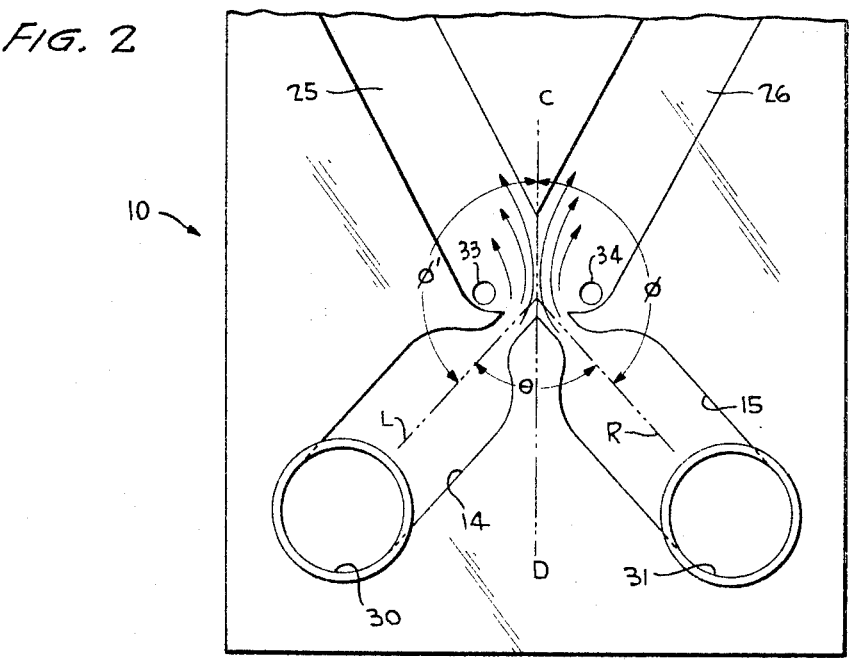
Figure 3:
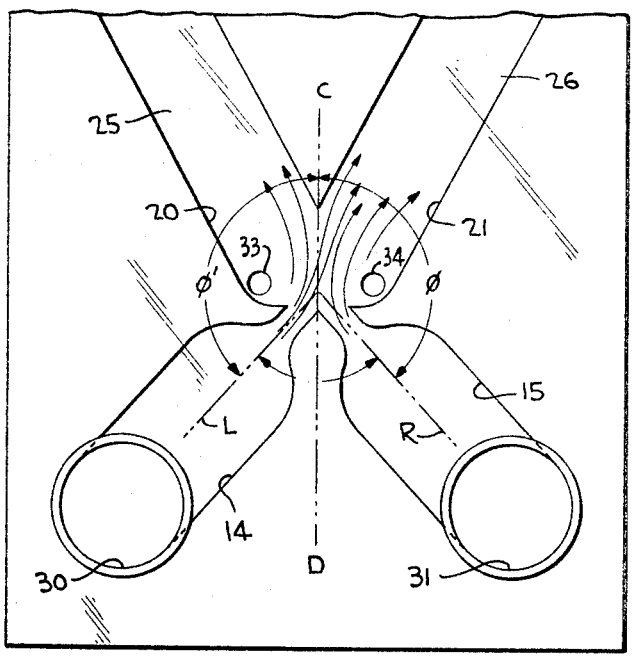

The above and still further objects, features and advantages of the present invention will become apparent upon consideration of the following detailed description of one specific embodiment thereof, especially when taken in conjunction with the accompanying drawings, wherein:

FIGURE 1 is a plan view of the pure fluid comparator constructed in accordance with this invention; and FIGURES 2 and 3 illustrate flow patterns of fluid in a pure fluid comparator under two sets of operating conditions.

Referring now to FIGURE 1 of the accompanying drawings for a more complete understanding of the invention, a pure fluid comparator 10 is formed in a flat plate 11 by molding, milling, casting or by other techniques which will form the necessary passages and cavities therein.

The plate 11 is covered by another flat plate 12 which is sealed to the plate 11, for instance, by machine screws, clamps, adhesives, or by any other suitable means. It is important that the connection between the plates be fluid-tight so that the fluid is confined to flow only in one plane within the passages and cavities formed in the plate 11. The plates 11 and 12 may be composed of any material compatible with the fluid employed, and may, for example, be composed of metal, plastic, ceramic or other suitable material. The fluid employed may be gaseous or liquid or combinations thereof, and as a matter of convenience, air and water may be used.

The fluid comparator 10 includes a pair of nozzles 14 and 15 which terminate in orifices 14a and 15a, respectively, the orifices communicating with two opposed end wall sections 16 of a stream interaction chamber 17. The nozzles 14 and 15 are preferably of the same size and shape. The nozzle orifices 14a and 15a are preferably of equal cross-sectional areas and one sidewall of each orifice 14a and 15a, respectively, converges to form a common edge 18 located symmetrically with respect to sidewalls 20 and 21 of the interaction chamber 17. The interaction chamber 17 is enclosed by the flat plate 12 and the bottom face of the chamber 17 is also planar so that the flow in the chamber 17 has an essentially rectangular cross-section. The edge 18 is essentially in horizontal alignment with the opposed wall portions forming the end wall 16. The sidewalls 20 and 21 are spaced remotely from the orifices 14a and 15a so that essentially no interaction and resulting boundary layer lock-on occurs between the streams issuing from the nozzles 14 and 15 and the sidewalls 21 and 20, respectively.

Located downstream of the orifices 15a and 16a is a flow divider 22 having the apex 23 thereof coincident with a reference or centerline CD, the centerline CD being inscribed symmetrically through the interaction chamber 17 and intersecting the edge 18. The lines OL and OR are taken symmetrically through the nozzles 14 and 15, respectively, and represent the longitudinal axes of these nozzles. The lines OL and OR intersect each other and the centerline CD at point 0. Angle $\theta$ is formed between the lines OL and OR and the centerline CD bisects that angle. In the particular embodiment illustrated, the distance from the edge 18 to the apex 23 is approximately three orifice widths and the angle $\theta$ is 90 degrees. Outlet flow passages 25 and 26 are defined between the sidewalls 20 and 21, extended, and the opposite sides of the diverging flow divider 22, respectively. The angles $\phi$ and $\phi'$ formed by the lines COR and COL are preferably greater than 90°. The angular position of the nozzles 14 and 15 with respect to each other and with respect to the interaction chamber 17 ensures that the passages 25 and 26 receive fluid from the nozzles 15 and 14, respectively, in the event there is absence of interacting flow issuing from one or the other of the nozzles. Fluid pressure signals are supplied to the comparator 10 from a suitable source (not shown) through inlet ducts or tubes 30 and 31 which are connected in the plate 12 and communicate with the input nozzles 14 and 15, respectively to discharge fluid into these nozzles. Outlets 33 and 34 are provided in the chamber 17 adjacent the sidewalls 20 and 21, respectively, the outlets 33 and 34 discharging fluid to an ambient pressure or predetermined pressure system and thereby maintain the pressures in the chamber 17 equal on both sides of the combined streams so that boundary layer effects are not created between the interacting fluid streams and the chamber sidewalls.

Assume for the purpose of illustrating the operation of the fluid pressure comparator 10 that the input fluid input signal supplied to the duct 31 is maintained at a constant reference pressure and that the duct 30 receives a variable or fluctuating pressure input signal. The fluctuating pressure signal may, for instance, be generated by conventional condition-responsive fluid devices such as a pressure bellows or a pivoting nozzle that supplies varying amounts of pressurized fluid to the duct 30 as determined by the angular position of the nozzle relative thereto.

With reference now to FIGURE 2, it will be evident that when the fluctuating fluid pressure in the tube 30 equals the monitored pressure of fluid in the tube 31, the two streams from the nozzles 14 and 15 are mutually deflected by stream interaction through equal angles and combine to form a composite stream directed towards the apex 23 along the centerline CD of the comparator 10. The combined stream is divided equally by the divider 22 and flow into the passages 25 and 26 is therefore symmetrical. This flow condition can also be considered a null condition since there will be essentially no movement of the interacting fluid streams across the centerline CD and there will be no differential output signal.

When pressure of the fluid in the tube 30 becomes slightly greater than the reference pressure of fluid in the tube 31, the larger analog type of fluid signal issuing from the nozzle 14 deflects the defined stream from the nozzle 15 as shown in FIGURE 3, toward the wall 21 and a small quantity of fluid from the nozzle 14 crosses the centerline CD and enters the passage 26 along with all of the fluid from the nozzle 15. The additional fluid flow in the passage 26 produces asymmetrical flow patterns in the passages 25 and 26 which are a function of the differentials between the input signals supplied to the nozzles 14 and 15 respectively.

When the pressure in the nozzle 14 is less than the pressure in the nozzle 15, the greater pressure differential produced by fluid issuing from the nozzle 15 will cause an asymmetrical flow condition wherein all of the fluid from the nozzle 14 enters the passage 25 along with a portion of the fluid from the nozzle 15. Thus the fluid issuing from the output passage 25 will have a greater pressure than the fluid issuing from the passage 26, the differential in pressure between the fluid streams being a function of the differentials in the parameter as stated above.

The comparator 10 can be weighted; that is, biased in favor of one input signal or the other, by varying the angles $\phi$ or $\phi'$ relative to each other. For example, if the angle $\phi'$ is made less than the angle $\phi$ the interaction region between the fluid streams will be shifted from the centerline COD to a region to the right of the apex 23 and as a result of the shifting of the interaction region to the right of the apex 23, more fluid from the nozzle 14 will have entered the entrance to the passage 26 prior to interaction. The interaction which occurs when fluid issues from the nozzle 15 will not be able to effect deflection of all of the fluid from the entrance of the passage 26 unless the input signal supplied to the nozzle 15 has a significantly greater magnitude than the input signal supplied to the nozzle 14. Therefore, the comparator 10 will be biased towards the output passage 26 and consequently be weighted in favor of the input nozzle 14. Conversely, if the angle $\phi$ is made less than the angle $\phi'$, the comparator will be biased towards the output passage 25 and weighted in favor of the input nozzle 15.

The angles $\phi$ and $\phi'$ can be changed by shifting the position of the flow divider 22 relative to the edge 18, and by changing the angular position of one input nozzle with respect to the other relative to the centerline CD.

While the comparator 10 is illustrated as being a momentum exchange type of fluid amplifier, as discussed hereinabove, if the sidewalls 20 and 21 were positioned sufficiently proximate the interacting fluid streams, then boundary layer effect would be created and the combined fluid stream would egress from either output passage 25 or 26 depending upon the relative magnitudes of the input signals supplied to the nozzles 15 and 14, respectively. In this type of comparator a "null" will not occur since the fluid stream will be flowing in either the output passage 25 or the output passage 26, and of course, there would be no outlets, such as the outlets 33 and 34, for equalizing the pressures between the sidewalls 20 and 21 and the interacting fluid streams and thereby preventing the creation of boundary layer effects.

A controllable residual hysteresis characteristic is ordinarily an advantageous characteristic of a comparator. In order to clearly understand what is meant by the term "residual hysteresis" as applied to pure fluid components, assume that a stream of fluid is flowing through the interaction chamber 17. The stream entrains the fluid on both sides of the chamber and tends to reduce the pressure on each side of the chamber as a result of the extraction of fluid due to entrainment. If the streams issuing from the orifices 14a and 15a have equal characteristics the resulting combined stream divides equally with respect to the apex of the divider 22 and the combined stream of fluid is then equally effective in removing fluid from both sides of the chamber so that any reduction in the pressure in the regions between the two sidewalls 20 and 21 of the interaction chamber 17 and the sides of the fluid stream is equal. However, if the two input streams have different parameters the combined stream will be deflected towards one sidewall rather than the other, for instance, closer to the sidewall 20 than the sidewall 21 due to the fact that the pressure region between one side of the stream and the sidewall 20 becomes smaller than the corresponding pressure region on the other side of the stream. The pressure in the region between the one side of the stream is thusly reduced to a greater extent than the pressure in the region between the other side of the stream and the sidewall 21. This results in a differential in pressure across the combined stream which, insofar as the comparator is concerned, has the same effect as a differential in parameters between the two input signals. In consequence, the apparatus cannot go through null directly when the signals from the two orifices are equal since the differential in pressure created by the stream being closer to one sidewall than to the other sidewall must also be overcome.

This phenomenon has been hitherto referred to as the residual hysteresis characteristic of the fluid comparator and represents the percent change in control pressure required to switch from a null output condition, once the null input condition is created. As mentioned hereinabove the switching time for a pure fluid comparator is significantly faster than that of mechanical comparators embodying moving elements.

While the angle $\theta$ is illustrated as being approximately 90° the angle may be varied within limits. As the angle $\theta$ increases to approach 180°, the output signal level for a given input signal level falls considerably below the value that the output signal level has when the angle $\theta$ is approximately 90°. The drop in the output signal level can be attributed to the energy losses which result as the stream inputs from the input nozzles approach and impinge against each other in direct opposition. In addition, it has been observed that when the nozzles are in opposed or substantially opposed relationship the nozzle issuing the greater magnitude fluid signal will prevent flow from the opposed nozzle receiving the lower magnitude fluid signal on the greater magnitude streams may enter the opposed control nozzle through the orifice of that nozzle. Therefore, it is preferable that the angle $\theta$ between the input nozzles be considerably less than 180° to reduce energy losses and to prevent the entry of fluid into one nozzle from the other nozzle issuing a greater magnitude stream. The minimum value of angle $\theta$ will be generally prescribed by the design of the interaction chamber and by the characteristics of the input signal, as will be apparent to those working in the art.

As will be apparent to those skilled in the art, the fluid output signals from the pure fluid comparator disclosed hereinabove may be used to drive or control other types of pure fluid units, or other types of systems which utilize fluid for the control or operation thereof.

While I have described and illustrated one specific embodiment of my invention, it will be clear that variations of the details of construction which are specifically illustrated and described may be resorted to without departing from the true spirit and scope of the invention as defined in the appended claims.

I claim:

1. A pure fluid comparator comprising an interaction region, only two outlet passages positioned adjacent one end of said interaction region, a divider positioned between said outlet passages, a pair of nozzles for issuing fluid streams into said interaction region, said nozzles lying at the other end of said interaction region on opposide sides of the centerline of said divider, the centerlines of both said nozzles lying at elss than 90° relative to the centerline of said divider.

2. The combination according to claim 1 wherein said nozzles each direct its flow to a different one of said outlet passages in the absence of flow from the other said nozzle.

3. The combination according to claim 1 wherein the centerlines of said nozzles form equal angles with the centerline of said divider.

4. The combination according to claim 1 wherein means are provided to prevent boundary layer effects from affecting the position of the streams issued by said nozzles.

5. The combination according to claim 1 wherein the centerlines of said nozzles are symmetrical with respect to the centerline of said divider and lie at different angles relative thereto.

6. The combination according to claim 5 wherein the angle between said nozzles is approximately 90°.

References Cited by the Examiner

UNITED STATES PATENTS

| | | | |
|---|---|---|---|
| 3,080,886 | 3/1963 | Severson | 137—81.5 |
| 3,107,850 | 10/1963 | Warren et al. | 137—81.5 X |
| 3,122,165 | 2/1964 | Horton | 137—81.5 |
| 3,209,774 | 10/1965 | Manion | 137—81.5 |

FOREIGN PATENTS 1,278,781   11/1961   France.

M. CARY NELSON, *Primary Examiner.*

LAVERNE D. GEIGER, *Examiner.*

S. SCOTT, *Assistant Examiner.*